United States Patent [19]
Nebenzahl

[11] Patent Number: 5,164,723
[45] Date of Patent: Nov. 17, 1992

[54] CONFIGURABLE KEYBOARD

[76] Inventor: Israel D. Nebenzahl, 33 Omri Street, Tel Aviv 69 019, Israel

[21] Appl. No.: 553,424

[22] Filed: Jul. 17, 1990

[30] Foreign Application Priority Data

Jul. 23, 1989 [IL] Israel ................................. 91076

[51] Int. Cl.⁵ .................. G06F 3/00; H01H 9/18; H01H 13/70
[52] U.S. Cl. ........................ 341/23; 400/90; 364/709.15; 200/309; 200/313; 200/317; 200/DIG. 47
[58] Field of Search ............. 200/299, 308, 309, 310, 200/311, 312, 313, 314, DIG. 47, 317; 340/711; 341/22, 23, 31; 364/709.12, 709.14, 709.15; 400/72, 89, 90

[56] References Cited

U.S. PATENT DOCUMENTS

| | | | |
|---|---|---|---|
| 1,823,319 | 9/1931 | Dickinson | 200/DIG. 47 |
| 2,265,124 | 12/1941 | Andres | 200/DIG. 47 |
| 3,611,359 | 10/1971 | Panerai | 200/DIG. 47 |
| 3,670,322 | 6/1972 | Mallebrein | |
| 3,879,722 | 4/1975 | Knowlton | |
| 3,934,246 | 1/1976 | Mueller | |
| 4,071,726 | 1/1978 | Werda | 200/311 |
| 4,078,257 | 3/1978 | Bagley | |
| 4,163,883 | 8/1979 | Boulanger | 200/314 |
| 4,280,121 | 7/1981 | Crask | |
| 4,334,210 | 6/1982 | Boulanger et al. | |

FOREIGN PATENT DOCUMENTS

| | | |
|---|---|---|
| 0226392 | 6/1987 | European Pat. Off. |
| 2488708 | 2/1982 | France |
| 1-265420 | 10/1989 | Japan |
| 1363176 | 12/1987 | U.S.S.R. |
| 2149353 | 6/1985 | United Kingdom |
| 2181283 | 4/1987 | United Kingdom |
| 8806332 | 8/1988 | World Int. Prop. O. |

OTHER PUBLICATIONS

"Electronically Changeable Keyboard Key Inscriptions", IBM Technical Disclosure Bulletin, vol. 23, No. 3, Aug. 1980, p. 1190.

Hoevel, L. W. et al. Keyboard with Optically Changeable Key Symbols, IBM Tech. Bull. vol. 26, No. 9, pp. 4582-4583, Feb. 1984.

Jones, I. Programmable Keytop Employing Electrochromic Display, IBM Tech. Dis. Bull. vol. 21, No. 4 Sep. 1978.

Stephany, J. F. and Gates, I. P., Liquid Crystal Keyboard, Xerox Dis. J., vol. No. 5, Sep. 1980.

Margun, P. Programmable Illuminated Typewriter Keyboard, IBM Tech. Dis. Bull. vol. 19, No. 5, Oct. 1976.

Hebalkar, P. G., Programmable Key-Tops for Display Terminal Keyboards, IBM Tech. Dis. Bull. vol. 21, No. 5, Oct. 1978.

Arfman, K. D., Changeable Keyboard, IBM Tech. Dis. Bull. vol. 11, No. 7, Dec. 1968.

*Primary Examiner*—Donald J. Yusko
*Assistant Examiner*—John Giust
*Attorney, Agent, or Firm*—Hill, Van Santen, Steadman & Simpson

[57] ABSTRACT

A keyboard has a plurality of key operated switches, each including a key having a manually engagable key surface. The keyboard selectively determines the function produced by operation of the key operated switches, and displays on each key its current function. The display provides a sensible output indication corresponding to the current function of each key, and includes an elongate strip symbol bearing member located alongside each key and lying in a plane generally perpendicular to the plane of each key surface.

21 Claims, 12 Drawing Sheets

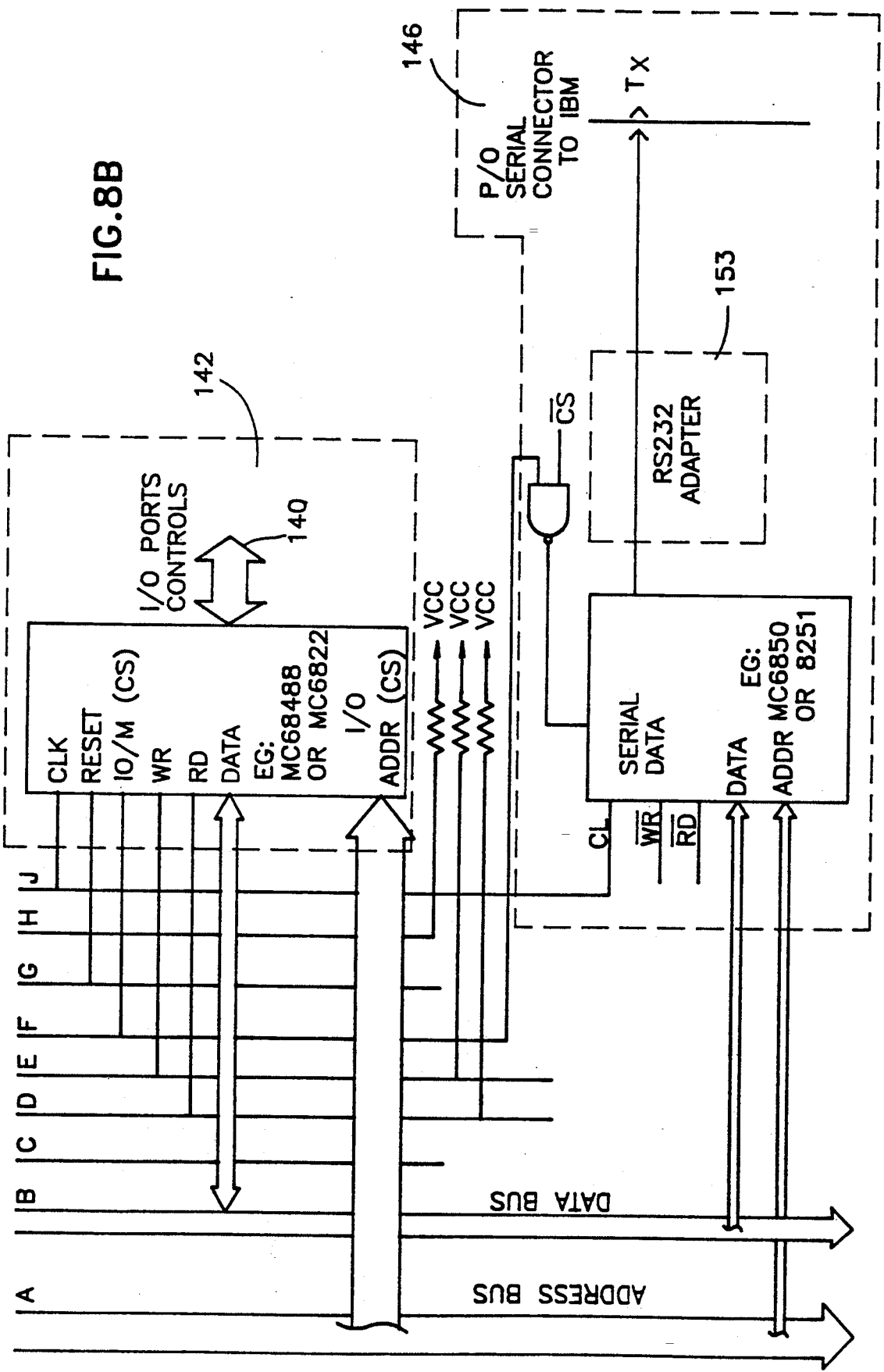

CONFIGURABLE KEYBOARD

FIELD OF THE INVENTION

The present invention relates to keyboards generally and more particularly to selectably configurable keyboards.

BACKGROUND OF THE INVENTION

Various types of configurable keyboards are known in the literature. U.S. Pat. No. 4,647,911 describes a calculator with definable keys as well as a typewriter keyboard with definable keys. It is suggested in the patent that removable or erasable indicia be provided in association with the definable keys for indicating the definitions of such keys.

U.S. Pat. No. 4,431,988 describes a microprocessor-based keyboard/display unit for configuring control instruments which incorporates a configurable keyboard but does not provide means for indicating the key definitions on the keyboard.

U.S. Pat. No. 4,551,717 describes an intelligent key display wherein each key comprises a microchip device and one or more liquid crystal displays to indicate the programmed function of the key.

U.S. Pat. No. 4,385,366 describes a configurable keyboard wherein the key definition appears on a display below a transparent key and is viewed therethrough. U.S. Pat. No. 4,333,090 illustrates a similar structure.

There is described in IBM Technical Disclosure Bulletin Vol 23, No. 3, August, 1980 at page 1190 electronically changeable keyboard key inscriptions which employ liquid crystal displays in the keyboard connected by wires to a signal source.

There is described in IBM Technical Disclosure Bulletin Vol 23, No. 10, March, 1981 at page 4611 optically powered and controlled electronically alterable key labeling which employs a liquid crystal display formed in the key itself and which obtains display information optically from the base of the key.

There is described in IBM Technical Disclosure Bulletin Vol 19, No. 5, October, 1976 at page 1544 a programmed illuminated typewriter keyboard wherein display information is supplied via an optical conduit, such as an optical fiber bundle from light emitting elements to a display surface defined in the key. The optical conduit is normally fixedly attached to the key and comes into light receiving relationship with the light emitting elements when the key is in its non-depressed orientation.

There is described in IBM Technical Disclosure Bulletin Vol 22, No. 4, September, 1979, at page 1370 a programmed illuminated typewriter keyboard wherein display information is supplied via an optical conduit, such as a flexible optical fiber bundle from a light source to a display surface defined in the key.

U.S. Pat. No. 4,633,227 describes a programmable keyboard for a typewriter or similar article wherein the key definition is displayed at a window location adjacent each key. The display information is provided by mechanically movable symbol bearing strips or by LCD displays located below the key definition display locations. This structure provides a very small key definition display.

U.S. Pat. No. 4,481,508 describes a programmable keyboard wherein the functions of the keys are displayed in a dot matrix display disposed thereabove.

U.S. Pat. No. 4,441,001 describes a keyboard for inputting plural letters or symbols which is similar to that described in U.S. Pat. No. 4,633,227.

SUMMARY OF THE INVENTION

The present invention seeks to provide an improved configurable keyboard which is relatively simple and of low cost.

There is thus provided in accordance with a preferred embodiment of the invention a keyboard comprising a plurality of key operated switches, each including a key having a manually engagable key surface, means for connecting the key operated switches to key operated utilization apparatus, means for selectably determining the function produced by operation of each of the key operated switches, and display means for displaying on each key its current function, as determined by the means for selectably determining, the means for displaying including means for providing a sensible output indication corresponding to the current function of each key at a location alongside each key.

Further according to a preferred embodiment of the present invention, each of the keys includes means for redirecting light received from the sensible output indication to impinge on the manually engagable key surface, for providing a display of the current function of that key.

Still further in accordance with a preferred embodiment of the present invention, the display of the current function of a key is formed on the manually engagable key surface.

Additionally in accordance with a preferred embodiment of the present invention, the manually engagable key surface comprises a transparent surface or a translucent surface.

Further in accordance with a preferred embodiment of the present invention, the keyboard also comprises at least one illumination source.

Still further in accordance with a preferred embodiment of the present invention, the display means also comprises magnifying or reducing lens means.

Additionally in accordance with a preferred embodiment of the present invention, the display means comprises a double sided mirror disposed within each key or a plurality of mirrors.

Further in accordance with a preferred embodiment of the present invention, the double sided mirror includes a first reflecting surface and the means for providing a sensible output indication includes a selectably configurable mask associated with each key, the double sided mirror being operative to reflect illumination from a source of illumination located below the key and to direct the illumination to an adjacent key via a selectably configurable mask which displays the current function of the adjacent key.

Additionally in accordance with a preferred embodiment of the present invention, the double sided mirror includes a second reflecting surface and the means for providing a sensible output indication includes a selectably configurable mask associated with each key, the second reflecting surface being arranged to receive illumination via a selectably configurable mask disposed adjacent thereto and to direct the illumination onto a manually engagable surface for display thereat of the current function of the corresponding key.

Still further in accordance with a preferred embodiment of the present invention, the selectably configurable mask comprises a liquid crystal display.

Additionally in accordance with a preferred embodiment of the present invention, the display means also comprises lens means having optical power.

Still further in accordance with a preferred embodiment of the present invention, the output indication of each key is viewed through the manually engageable key surface.

Additionally in accordance with a preferred embodiment of the present invention, the means for redirecting light comprises reflecting surfaces having optical power.

Further in accordance with a preferred embodiment of the present invention, the display means comprises an upwardly facing reflecting surface disposed interiorly of each of the keys.

Still further in accordance with a preferred embodiment of the present invention, the keyboard also comprises at least one downwardly facing reflecting surface disposed within each key.

Further in accordance with a preferred embodiment of the present invention, the upwardly facing reflecting surface and the downwardly facing reflecting surface are the two sides of a double sided mirror.

Additionally in accordance with a preferred embodiment of the present invention, the means for providing a sensible output indication comprises a selectably configurable mask and/or a replaceable template.

Still further in accordance with a preferred embodiment of the present invention, the downwardly facing reflecting surfaces are operative to reflect illumination from a source of illumination located below the key and to direct the illumination to adjacent keys via a selectably configurable mask which displays the current function of the adjacent keys.

Additionally in accordance with a preferred embodiment of the present invention, the upwardly facing reflecting surface is arranged to receive illumination via a selectably configurable mask disposed adjacent thereto and to direct the illumination onto a manually engageable surface for display thereat of the current function of the corresponding key.

BRIEF DESCRIPTION OF THE DRAWINGS

The present invention will be understood and appreciated more fully from the following detailed description, taken in conjunction with the drawings in which:

FIG. 8B is an illustration of the circuitry in blocks 142 and 146 of FIG. 7;

DETAILED DESCRIPTION OF A PREFERRED EMBODIMENT

The purpose of the present invention is to provide an economical and ergonometric multi-use keyboard, wherein the symbol associated with each key during each given mode of operation is displayed on the key and is readily seen by the operator.

Figure 1A:
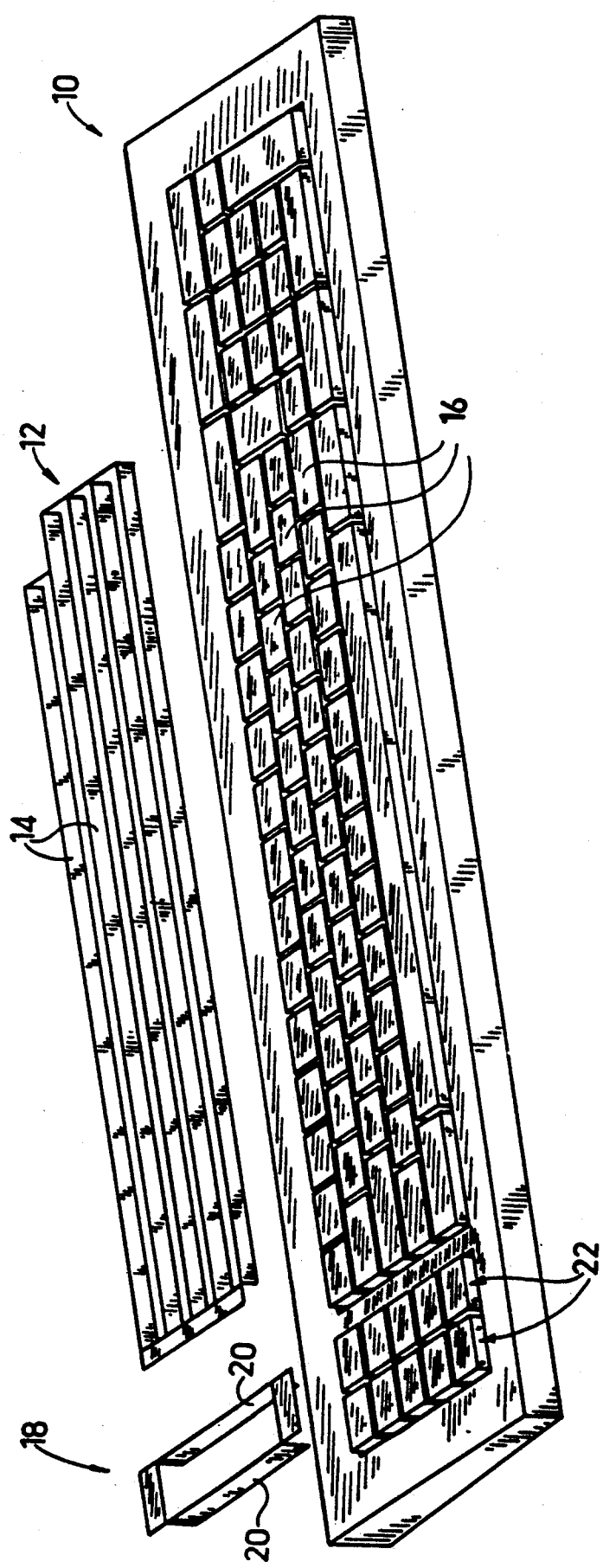
FIG. 1A is a partially exploded pictorial illustration of a keyboard constructed and operative in accordance with a preferred embodiment of the present invention.
Figure 1B:
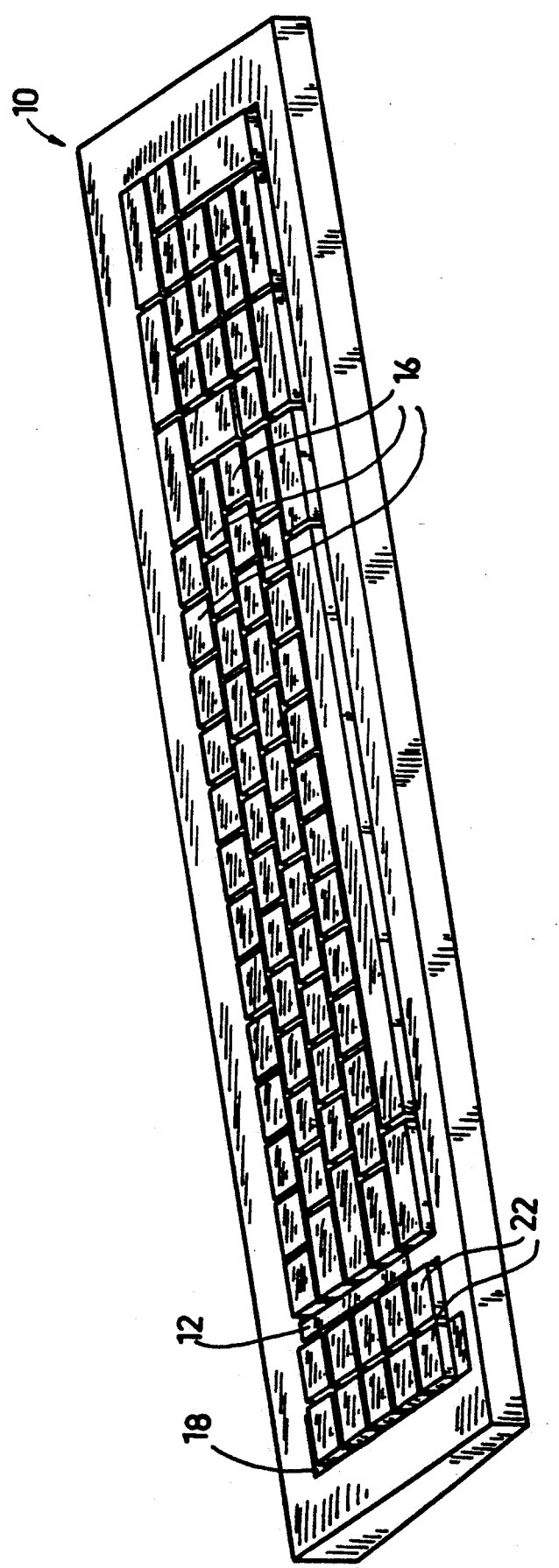
FIG. 1B is pictorial illustration of the keyboard of FIG. 1A in an assembled orientation.

Reference is now made to FIGS. 1A and 1B, which illustrate a keyboard constructed and operative in accordance with a preferred embodiment of the present invention. The keyboard typically comprises a standard conventional keyboard 10, such as a commercially available keyboard for an IBM PC computer having modifications as described hereinbelow.

In accordance with a preferred embodiment of the present invention, an array 12 of display strips 14, typically in the form of liquid crystal display strips, such as the strips available from Hamlin Inc., Catalog No. 313-431, of 614 E. Lake Street, Lake Mills, Wis. 53551, U.S.A. The array 12 is interposed adjacent horizontal rows of symbol keys 16 in symbol display relationship therewith. An additional array 18 of display strips 20 may also be interposed adjacent vertical columns of function keys 22 in function display relationship therewith. The display strips provide a selectable optical mask, which defines an optical image when light is caused to pass therethrough.

Alternatively, the display strips 14 and 20 may comprise cardboard or plastic templates bearing the symbols corresponding to each key. The symbols corresponding to each key may be changed by manually replacing the arrays 12 and 18 of display strips 14 and 20. For example, in an electric typewriter, the display strips could be replaced simultaneously with replacement of the font ball. In Daisy-wheel printer applications, the display strips could be replaced simultaneously with replacement of the daisy-wheel of the printer.

The keys 16 and 22 are modified to provide a desired light path therethrough as will be described hereinbelow with reference to FIGS. 2A-6.

The optical structure and electrical circuitry of the invention which provides a high quality, easy to read display on the keys will now be described in detail with reference to FIGS. 2A-10.

Figure 2A:
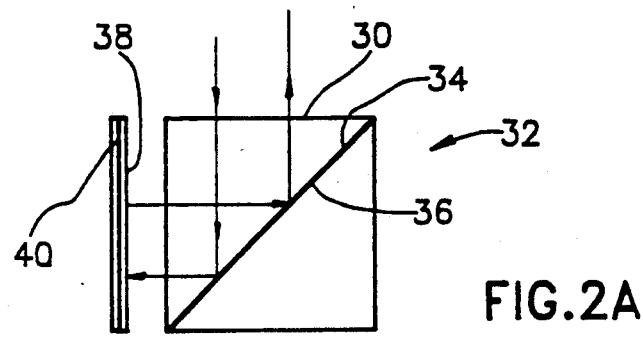
FIG. 2A is an illustration of key function illumination means employing available light.
Figure 2B:
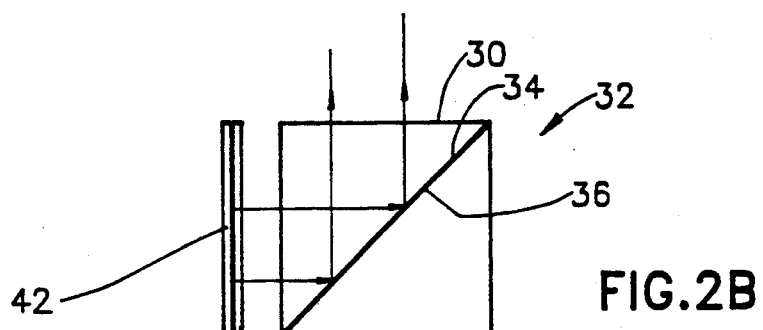
FIG. 2B is an illustration of key function illumination means comprising a light source.

Reference is now made to FIGS. 2A and 2B which illustrate two alternative key function indication arrangements constructed and operative in accordance with a preferred embodiment of the present invention. In the embodiment of FIG. 2A ambient light is received through the top face 30 of a generally transparent key 32 and is reflected by the top facing reflecting surface 34 of a diagonally disposed mirror 36 disposed in key 32, through the key and via a portion 38 of a display strip, which is associated with a reflective surface 40. Alternatively, key 32 may comprise a prism.

Mirror 36 is a mirror in the broad sense of the word, namely a generally light reflective surface, such as a polished plastic surface.

The light is reflected by the reflective surface via portion 38 of the display strip, back through the key 32 and off surface 34 to the eye of an operator, thereby bearing an indication provided by the display strip, indicating the key function.

Reference is now made to FIG. 2B, which illustrates an alternative embodiment of the invention wherein a generally flat light source 42, such as an electroluminescent lamp commercially available from Loctite Luminescent Systems, Inc. of Lebanon, N.H., is disposed behind a display strip 44. Light from the light source 42 passes through the display strip 44, which defines an optical image. The light then is reflected by surface 34 and passes through the key 32 to the eyes of the viewer, providing a visual indication of the key function, as indicated on the display strip.

Figure 3B:
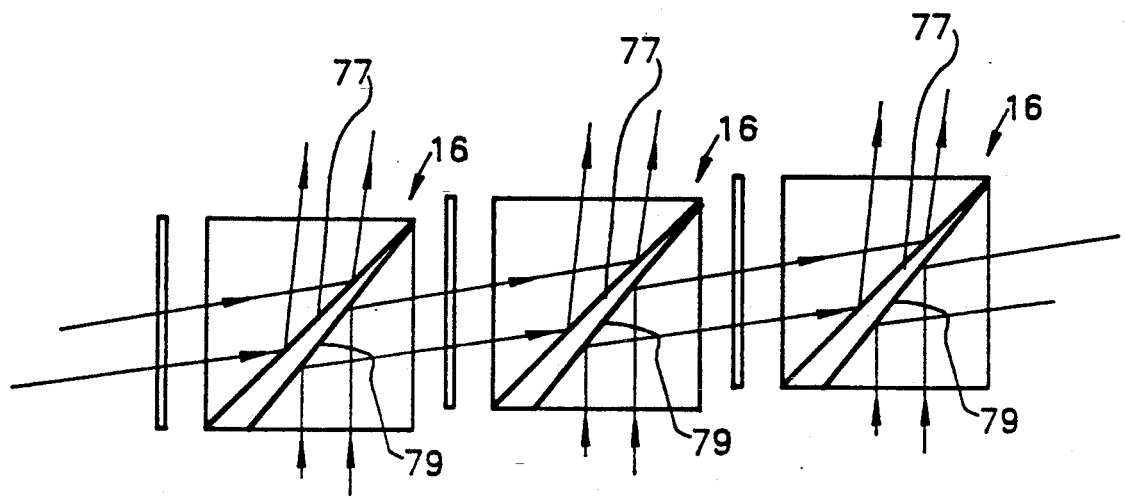
FIG. 3B is an illustration of a key function illumination arrangement employing a key defining two separated reflecting surfaces.
Figure 3C:
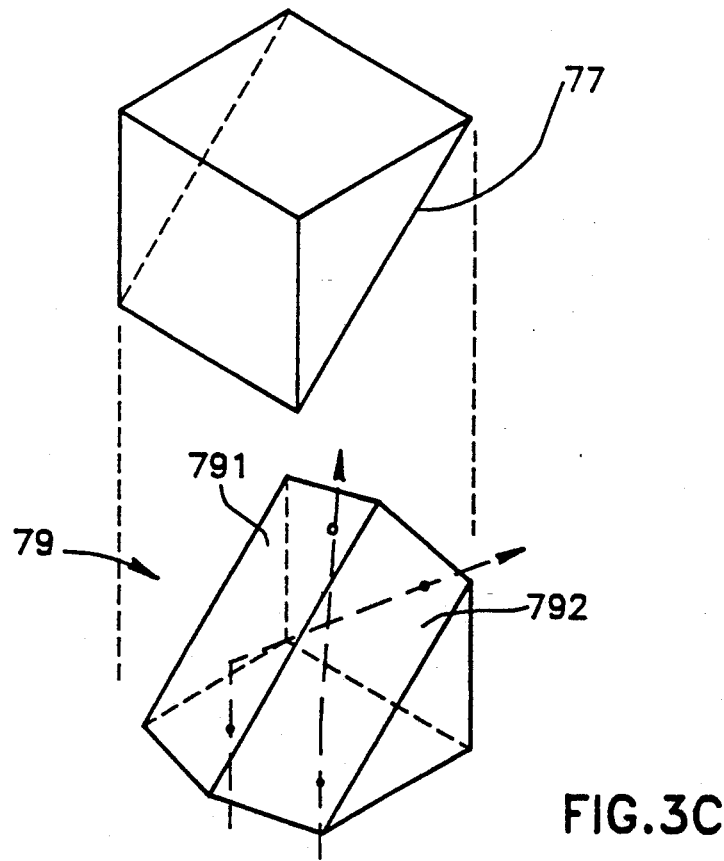
FIGS. 3C and 3D are detailed illustrations of bottom facing reflective surfaces constructed and operative in accordance with two alternative embodiments of the invention.
Figure 3E:
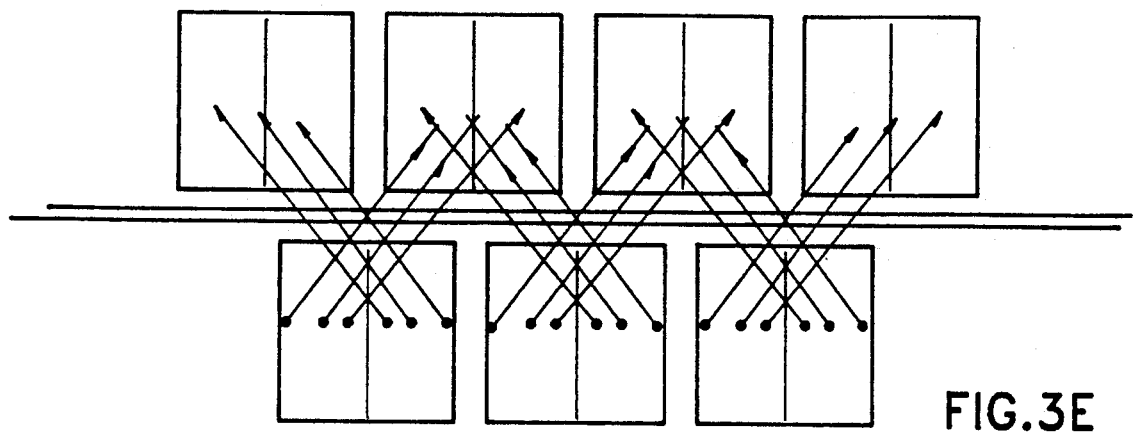
FIG. 3E is a schematic illustration of a light path arrangement among a plurality of keys in accordance with a preferred embodiment of the present invention.
Figure 3D:
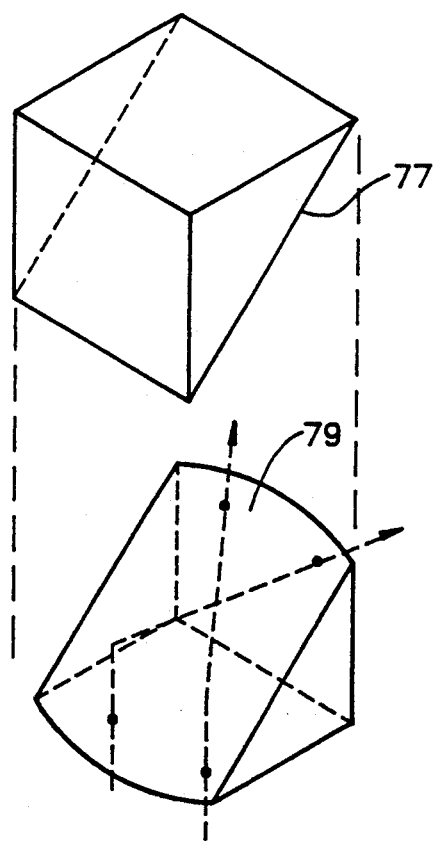
Figure 3F:
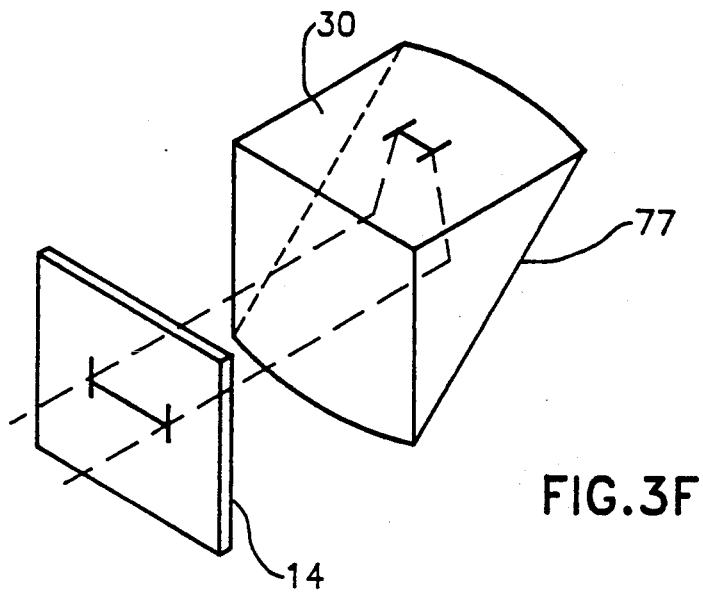
FIGS. 3F and 3G illustrate key function display arrangements constructed and operative in accordance with two alternative embodiments of the invention which include reflecting surfaces having optical power.
Figure 3G:
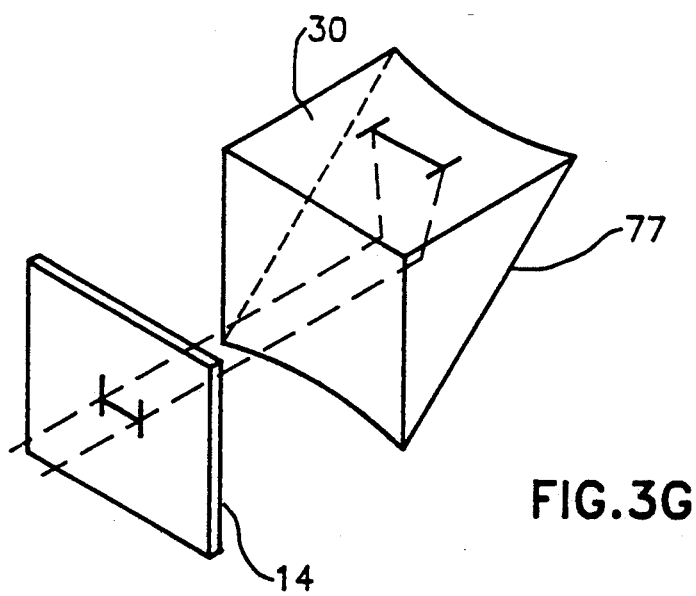
Figure 3A:
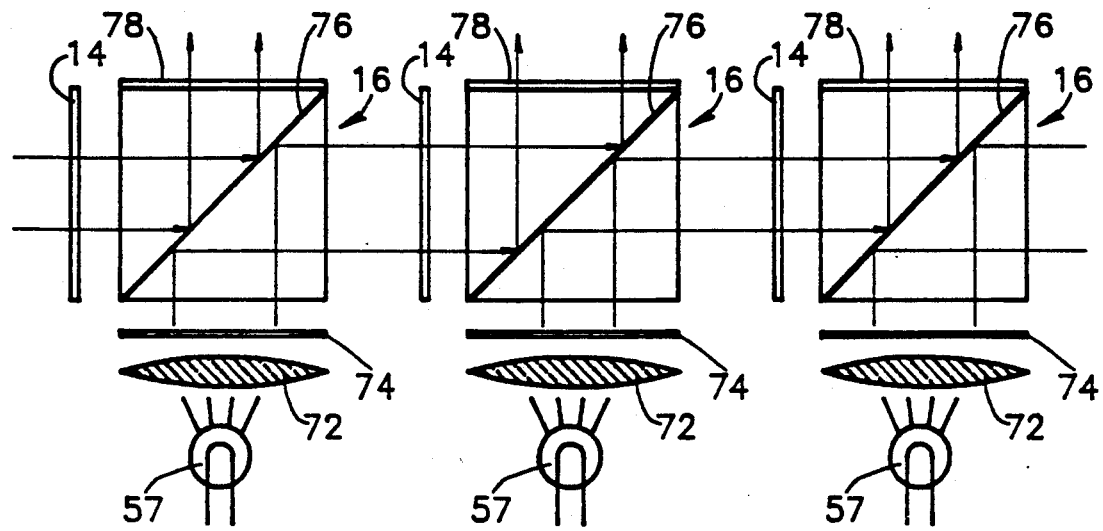
FIG. 3A is an illustration of a key function illumination arrangement constructed and operative in accordance with one embodiment of the present invention.

Reference is now made to FIGS. 3A and 3B which illustrate two alternative typical structures of keyboards constructed and operative in accordance with a preferred embodiment of the present invention.

As illustrated in FIG. 3A, there is associated with each key 16 a source of illumination such as a LED 57, which is preferably disposed below. Light from each LED 57 passes through a collimating lens 72 and via a color filter 74 into the key 16.

The keys 16 are designed to be generally transparent but preferably to include a double sided mirror 76, the bottom facing surface of which is operative to reflect light from the LED 57 underlying that key, sideways through a display strip 14 and into impingement with the top facing surface of a double sided mirror 76 of an adjacent key and thence upwardly through the generally transparent top surface 78 of the key 16 to the viewer. The viewer is thus presented with an image of a symbol or group of symbols which appears on otherwise transparent display strip 14, for each key, indicating the selectable key function.

Referring now to FIG. 3B, it is seen that instead of a two sided mirror, as in the embodiment of FIG. 3A, alternatively, two separate mirrors 77 and 79 may be employed inside each key 16, without otherwise changing the system. This arrangement enhances illumination of the keys, particularly when the keys are transversely oriented relative to the horizontal.

FIG. 3C is an exploded view of a key 16. Here, too, top and bottom facing mirrors 77 and 79 are provided, but in this embodiment, the bottom facing mirror 79 comprises two angled surfaces 791 and 792, so as to direct the incoming light in two different directions.

FIG. 3D illustrates an embodiment similar to FIG. 3C but wherein the bottom facing mirror 79 is concave so as to redirect the light in different directions.

FIG. 3E is a top view of a portion of two adjacent rows of keys where each key redirects the light to two adjacent keys by means of bottom facing mirrors of the type illustrated in FIG. 3C.

FIG. 3F shows a detailed view of the top part of a key in which the top facing mirror 77 is seen to be concave, thereby reducing the size of the image of mask 14 formed on the translucent top surface 30 of the key.

FIG. 3G shows a detailed view of the top portion of a key, in which the top facing mirror 77 is seen to be convex, thereby magnifying the image of mask 14 formed on the translucent top surface 30 of the key.

Figure 4:
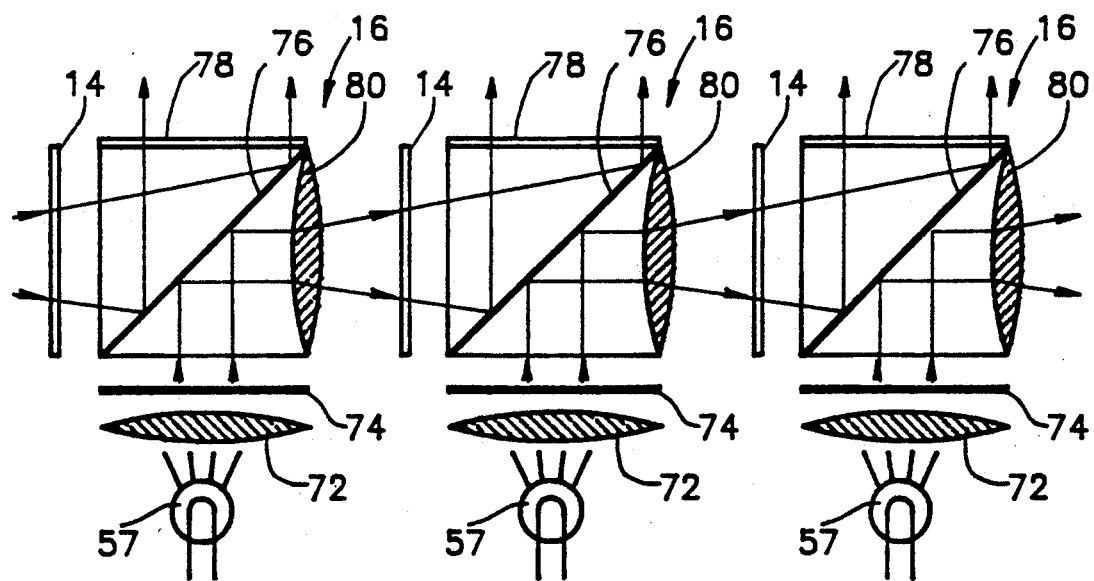
FIG. 4 is an illustration of a key function illumination arrangement constructed and operative in accordance with another embodiment of the present invention.

Reference is now made to FIG. 4, which illustrates a structure similar to that of FIG. 3A except that additional lenses 80, comprising either magnification lenses or reduction lenses, are provided in association with each key to provide an enlarged or reduced, as desired, image of the symbol appearing on display strip 14 to the user. The remaining elements of the structure of FIG. 4 are essentially similar to those shown in FIG. 3A and are indicated by identical reference numerals.

Figure 5:
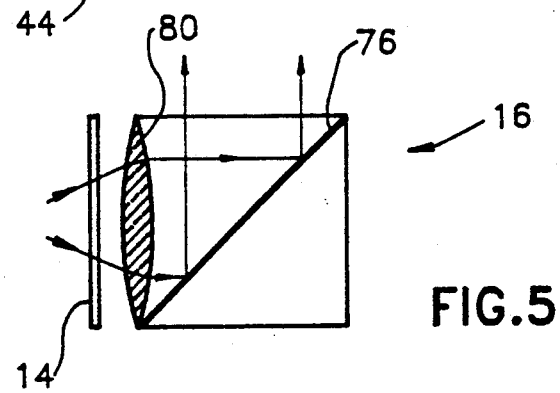
FIGS. 5 and 6 are illustrations of two further alternative embodiments of key function illumination apparatus.
Figure 6:
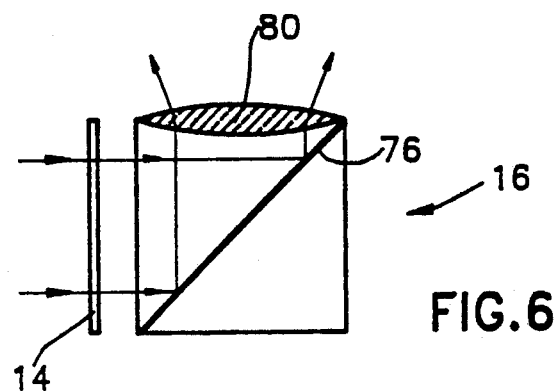

Reference is now made to FIGS. 5 and 6 which illustrate two alternative embodiments of the key configuration employed in the embodiment of FIG. 4. In FIG. 5, a magnifying or reducing lens 80 is located at the surface of the key adjacent the display strip 14, while in FIG. 6, the magnifying or reducing lens 80 is located at the top of the key 16.

Figure 7:
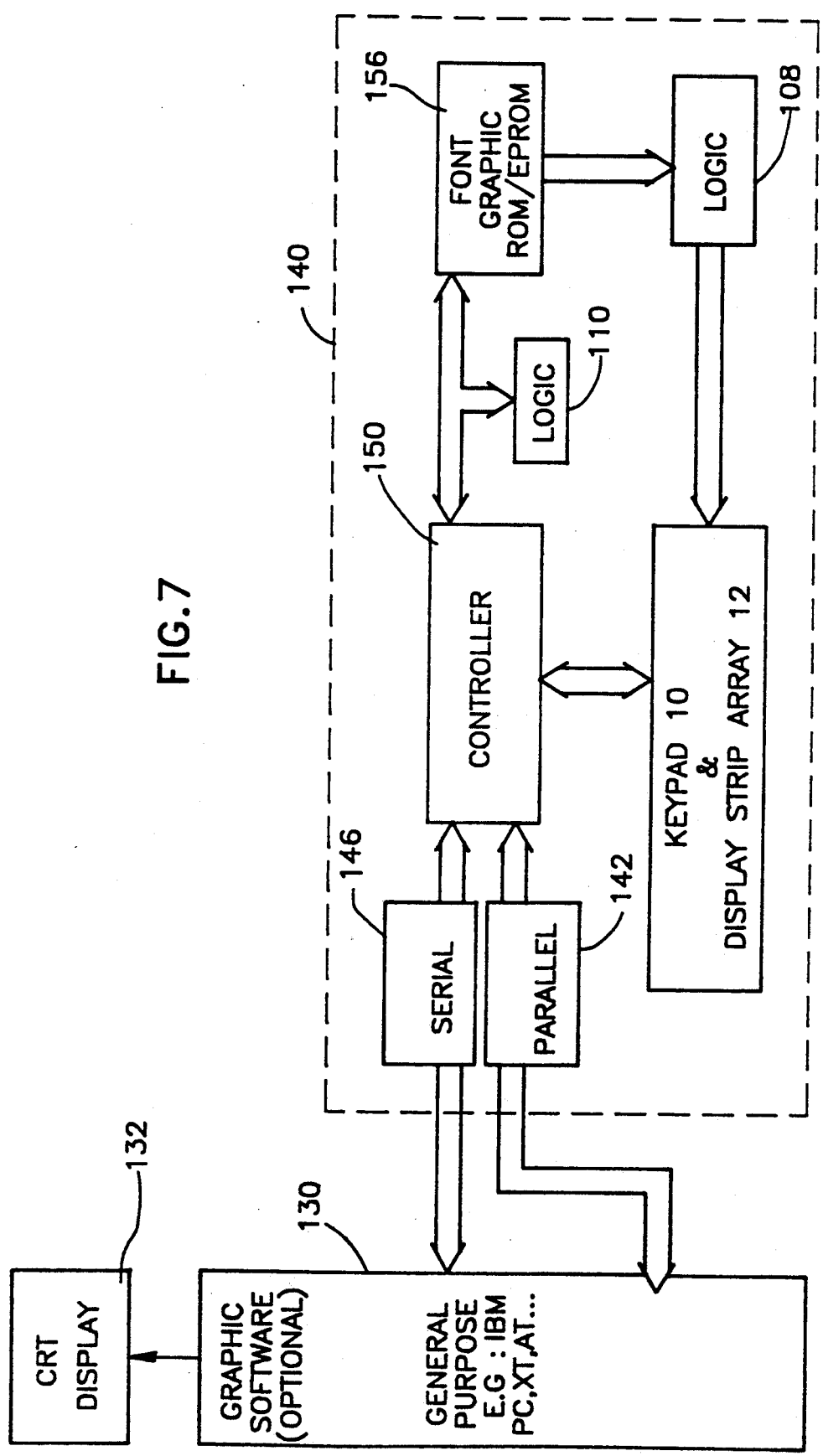
FIG. 7 is a general block diagram of the apparatus of the present invention.

Referring now to FIG. 7, there is seen a general block diagram of the electrical circuitry employed in accordance with a preferred embodiment of the present invention. For the purpose of ease of description, the invention is described hereinbelow in the context of a personal computer, it being understood, however, that the invention is not at all limited to use with a given computer, type of computer or type of machine. The invention may be useful, for example, with electronic typewriters which do not include computing capabilities.

In the illustrated embodiment of FIG. 7, the invention is seen associated with a general purpose computer 130 such as an IBM PC, XT or AT, which may have graphics hardware and software associated therewith. The provision of graphics hardware and software is not necessary however. The computer 130 is typically associated with a conventional CRT display 132. A keyboard system 140, constructed and operative in accordance with a preferred embodiment of the invention, is operatively associated with computer 130 and display 132.

In accordance with the present invention, the keyboard system 140 comprises a parallel keyboard interface 142, which is coupled to a parallel port of the computer. Circuitry 142 is typically located in the keyboard. Optionally, a serial interface 146 may be provided to communicate with the computer 130, typically via an RS 232 computer port.

Figure 8A:
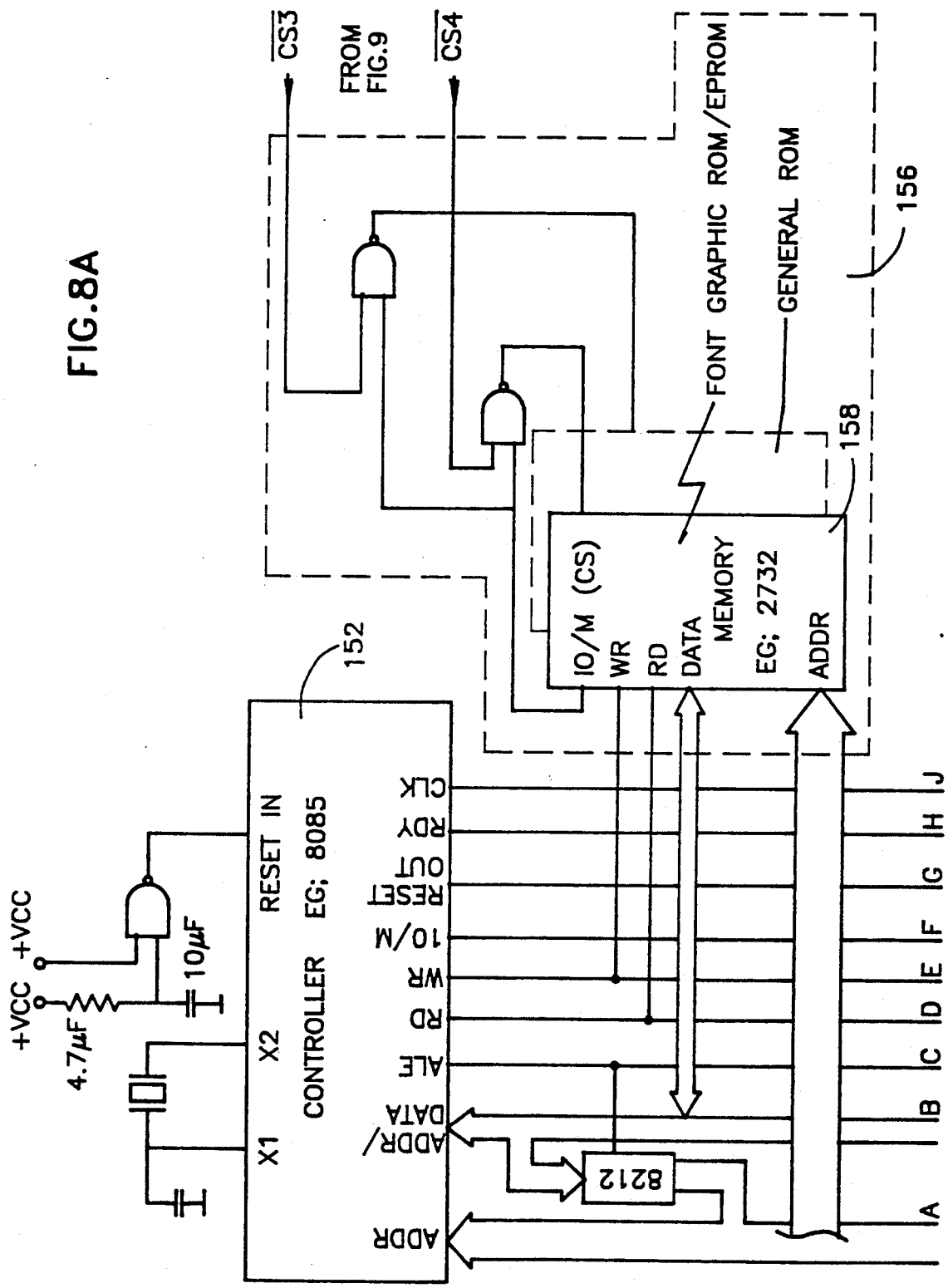
FIG. 8A is an illustration of the circuitry in blocks 150 and 156 of FIG. 7.

Referring now additionally to FIGS. 8A and 8B, it is seen that the keyboard circuitry 140 typically comprises a controller 150, based on a CPU module 152 such as an Intel 8031, 8085 or 8086. The CPU module 152 interfaces with computer 130 via either of parallel or serial interfaces 142 and 146. Parallel interface 142 typically comprises a MC 68488 or a MC 6822 chip from Motorola. Serial interface 146 typically comprises a Motorola MC 6850 chip or an Intel 8251 chip and may include RS 232 adapter circuitry 153, such as Motorola 1488 and 1489 chips.

The controller 150 also interfaces with font &/or graphic ROM/EPROM circuitry 156 typically comprising a graphic EPROM 158, such as an Intel 2732 chip, which stores graphic pixel locations for display strip array 12 (FIG. 1A).

Figure 9:
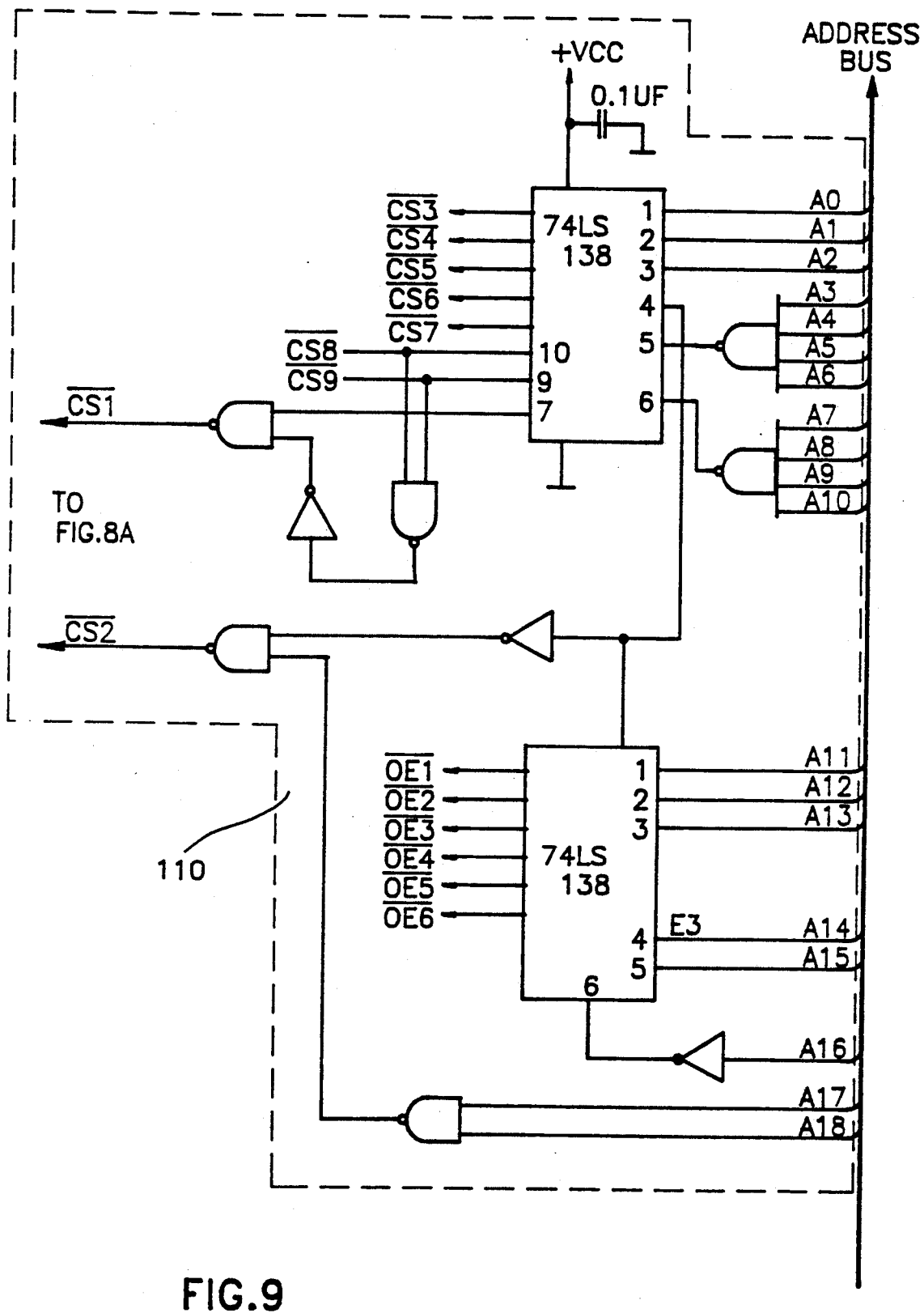
FIG. 9 is an illustration of the circuitry of block 110 of FIG. 7.

Chip select instructions to controller 150 are provided by logic circuitry 110, which is illustrated in FIG. 9 and typically is based on a pair of multiplexers such as National 74LS138 chips.

Figure 10:
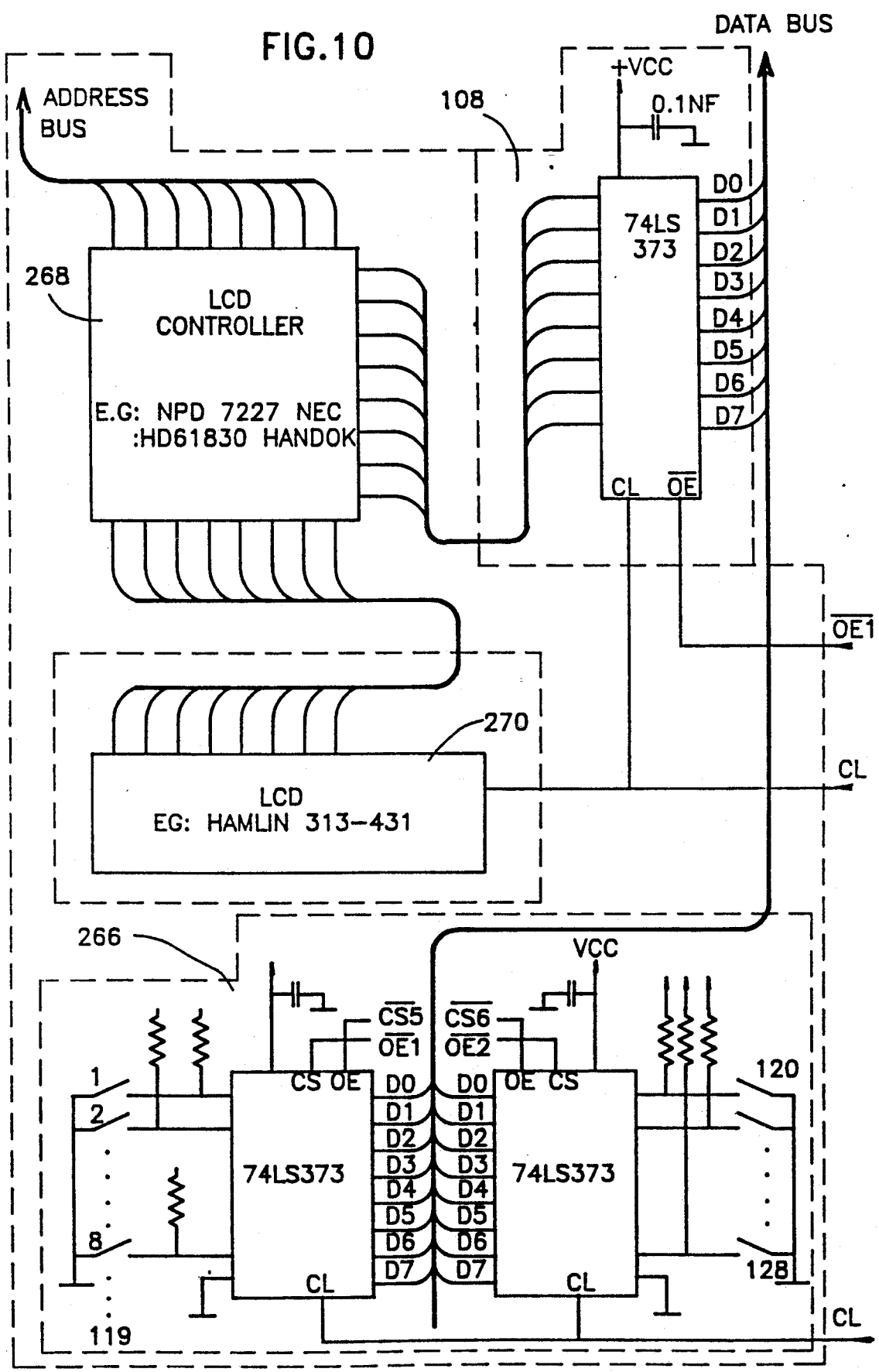
FIG. 10 is a block diagram illustration of an implementation of keypad 10, display strip array 12 and logic 108 of FIG. 7.

The output of circuitry 156 is supplied to the display strip array 12 associated with the keyboard 10 via logic circuitry 108, which is illustrated in detail in FIG. 10. As seen in FIG. 10, the logic circuitry 108 comprises a buffer such as a National 74LS373 chip.

FIG. 10 also illustrates in detail keyboard operation circuitry 266 and LCD driver circuitry 268, which is operative to drive LCD strips 270, which are employed in a preferred embodiment as the display strips 14 (FIG. 1A).

It will be appreciated by persons skilled in the art that the present invention is not limited by what has been particularly shown and described hereinabove. Rather the scope of the present invention is defined only by the claims which follow:

I claim:

1. A keyboard comprising:
   a plurality of key operated switches, each including a key having a manually engagable key surface lying generally in a plane;
   means for connecting the key operated switches to key operated utilization apparatus; and
   display means for providing through said key at said key surfaces a visually sensible output indication representing the function of each key and including an elongate symbol bearing strip member located alongside each key and lying in a plane generally perpendicular to the plane of said key surface.

2. A keyboard according to claim 1 and wherein said manually engagable key surface comprises a transparent surface.

3. A keyboard according to claim 1 and wherein said manually engagable key surface comprises a translucent surface.

4. A keyboard according to claim 1 and also comprising at least one illumination source.

5. A keyboard according claim 1 and wherein said display means also comprises magnifying lens means.

6. A keyboard according to claim 1 and wherein said display means comprises a double sided mirror disposed within each key.

7. A keyboard according to claim 1 and wherein said display means comprises a plurality of mirrors.

8. A keyboard according to claim 6 and wherein said double sided mirror includes a first reflecting surface and said symbol bearing member includes a selectably configurable mask associated with each key, said double sided mirror being operative to reflect illumination from a source of illumination located below the key and to direct said illumination to an adjacent key via a selectably configurable mask which displays the current function of said adjacent key.

9. A keyboard according to claim 6 and wherein said double sided mirror includes a second reflecting surface and said symbol bearing member includes a selectably configurable mask associated with each key, said second reflecting surface being arranged to receive illumination via a selectably configurable mask disposed adjacent thereto and to direct said illumination onto a manually engagable surface for display thereat of the current function of the corresponding key.

10. A keyboard according to claim 8 and wherein said selectably configurable mask comprises a liquid crystal display.

11. A keyboard according to claim 1 and wherein said display means also comprises lens means having optical power.

12. A keyboard according to claim 1 and wherein said output indication of each key is viewed through said manually engageable key surface.

13. A keyboard according to claim 1 and wherein said display means light comprises reflecting surfaces having optical power.

14. A keyboard according to claim 1 and wherein said display means comprises an upwardly facing reflecting surface disposed interiorly of each of said keys.

15. A keyboard according to claim 1 and also comprising at least one downwardly facing reflecting surface disposed within each key.

16. A keyboard according to claim 1 wherein said display means comprises an upwardly facing reflecting surface disposed interiorly of each of said keys, said keyboard also comprising at least one downwardly facing reflecting surface disposed within each key, and wherein said upwardly facing reflecting surface and said downwardly facing reflecting surface are the two sides of a double sided mirror.

17. A keyboard according to claim 1 and wherein said symbol bearing member comprises a selectably configurable mask.

18. A keyboard according to claim 1 and wherein said symbol bearing member comprises a replaceable template.

19. A keyboard according to claim 15 and wherein said downwardly facing reflecting surfaces are operative to reflect illumination from a source of illumination located below the key and to direct said illumination to adjacent keys via said symbol bearing member including a selectably configurable mask which displays the current function of said adjacent keys.

20. A keyboard according to claim 17 and wherein said selectably configurable mask comprises a liquid crystal display.

21. A keyboard according to claim 1 and wherein said display means also comprises reducing lens means.

* * * * *